US007756792B2

(12) United States Patent
Hughes

(10) Patent No.: US 7,756,792 B2
(45) Date of Patent: **\*Jul. 13, 2010**

(54) SYSTEM AND METHOD FOR CONTROLLING THE USE AND DUPLICATION OF DIGITAL CONTENT DISTRIBUTED ON REMOVABLE MEDIA

(75) Inventor: David Hughes, New York, NY (US)

(73) Assignees: Sony Corporation, Tokyo (JP); Sony Music Holdings Inc., New York, NY (US)

( * ) Notice: Subject to any disclaimer, the term of this patent is extended or adjusted under 35 U.S.C. 154(b) by 912 days.

This patent is subject to a terminal disclaimer.

(21) Appl. No.: 10/853,464

(22) Filed: May 24, 2004

(65) Prior Publication Data

US 2004/0220879 A1    Nov. 4, 2004

Related U.S. Application Data

(63) Continuation of application No. 10/295,807, filed on Nov. 15, 2002, now Pat. No. 6,748,537.

(60) Provisional application No. 60/335,112, filed on Nov. 15, 2001.

(51) Int. Cl.
    *G06Q 99/00* (2006.01)
(52) U.S. Cl. ............................ 705/57; 705/65; 705/51; 705/67; 713/193; 726/26
(58) Field of Classification Search ............. 705/50–79; 726/26–33; 713/193
    See application file for complete search history.

(56) References Cited

U.S. PATENT DOCUMENTS

| 4,757,534 A | 7/1988 | Matyas et al. |
| 4,827,508 A | 5/1989 | Shear |
| 5,450,489 A | 9/1995 | Ostrover et al. |
| 5,530,235 A | 6/1996 | Stefik et al. |
| 5,629,980 A | 5/1997 | Stefik et al. |
| 5,634,012 A | 5/1997 | Stefik et al. |
| 5,638,443 A | 6/1997 | Stefik et al. |
| 5,696,754 A | 12/1997 | Nishizawa |
| 5,715,403 A | 2/1998 | Stefik |
| 5,732,065 A | 3/1998 | Braat et al. |
| 5,799,081 A | 8/1998 | Kim et al. |

(Continued)

FOREIGN PATENT DOCUMENTS

EP    1 143 439    10/2001

(Continued)

OTHER PUBLICATIONS

European Search Report dated Apr. 6, 2009 issued in corresponding European Application No. 02789729.7.
"SDMI Portable Device Specification, Part 1, Version, 1.0" SDMI Secure Digital Music Initiative, Jul. 8, 1999, pp. 1-35, XP000997330.

*Primary Examiner*—Jalatee Worjloh
(74) *Attorney, Agent, or Firm*—Kenyon & Kenyon LLP

(57) ABSTRACT

Systems and methods for controlling the use and duplication of digital content distributed on removable media are described. In accordance with embodiments of the present invention digital content is protected by allowing a particular number of protected (e.g., encrypted) copies of the digital content to be made. Typically, these copies may only be used on and moved between authorized devices. In one embodiment, if copies are desired, the maximum number of allowable copies of the protected digital content are made and stored on a computer's hard drive when the storage medium (e.g., a CD) containing the content is inserted into the computer. Each copy can then be moved but not copied to other devices (e.g., portable solid state devices). In an alternative embodiment, the storage medium containing the digital content is writable (e.g., a CD-R). When the storage medium is inserted into the computer, the computer writes information to the storage medium which regulates future copying and playing of the digital content on the storage medium.

29 Claims, 4 Drawing Sheets

U.S. PATENT DOCUMENTS

| | | | |
|---|---|---|---|
| 5,828,648 | A | 10/1998 | Takasu et al. |
| 5,831,964 | A | 11/1998 | Tannaka |
| 5,845,065 | A | 12/1998 | Conte et al. |
| 5,845,281 | A | 12/1998 | Benson et al. |
| 5,892,900 | A | 4/1999 | Ginter et al. |
| 5,896,255 | A | 4/1999 | Mardirossian |
| 5,920,861 | A | 7/1999 | Hall et al. |
| 5,933,498 | A | 8/1999 | Schneck et al. |
| 5,940,504 | A | 8/1999 | Griswold |
| 5,943,422 | A | 8/1999 | Van Wie et al. |
| 5,959,946 | A | 9/1999 | Tognazzini |
| 5,963,909 | A | 10/1999 | Warren et al. |
| 5,982,891 | A | 11/1999 | Ginter et al. |
| 6,108,420 | A | 8/2000 | Larose et al. |
| 6,112,181 | A | 8/2000 | Shear et al. |
| 6,124,011 | A | 9/2000 | Kern |
| 6,141,753 | A | 10/2000 | Zhao et al. |
| 6,154,206 | A | 11/2000 | Ludtke |
| 6,157,721 | A | 12/2000 | Shear et al. |
| 6,185,683 | B1 | 2/2001 | Ginter et al. |
| 6,205,112 | B1 | 3/2001 | Weidner |
| 6,233,684 | B1 | 5/2001 | Stefik et al. |
| 6,236,971 | B1 | 5/2001 | Stefik et al. |
| 6,311,214 | B1 | 10/2001 | Rhoads |
| 6,361,845 | B1 | 3/2002 | Kern |
| 6,389,541 | B1 | 5/2002 | Patterson |
| 7,260,314 | B2 | 8/2007 | Yamamoto et al. |
| 2003/0172034 | A1* | 9/2003 | Schneck et al. ............... 705/54 |

FOREIGN PATENT DOCUMENTS

| | | |
|---|---|---|
| JP | 8-297859 | 11/1996 |
| JP | 09-093561 | 4/1997 |
| JP | 9-265667 | 10/1997 |
| JP | H11288555 | 10/1999 |
| JP | H11296984 | 10/1999 |
| JP | 2000-076790 | 3/2000 |
| JP | 2000-322826 | 11/2000 |
| JP | 2001-094554 | 4/2001 |
| JP | 2001-118332 | 4/2001 |
| JP | 2001-175524 | 5/2001 |
| JP | 2001-222861 | 8/2001 |
| JP | 2001-243707 | 9/2001 |
| WO | 98/02881 | 1/1998 |
| WO | WO 00/74053 A1 | 12/2000 |
| WO | WO 01/67668 | 9/2001 |
| WO | 03038821 | 5/2003 |

* cited by examiner

SYSTEM AND METHOD FOR CONTROLLING THE USE AND DUPLICATION OF DIGITAL CONTENT DISTRIBUTED ON REMOVABLE MEDIA

This application is a continuation of U.S. application Ser. No. 10/295,807 filed Nov. 15, 2002 now U.S. Pat. No. 6,748,537.

This application claims the benefit of U.S. Provisional Application No. 60/335,112, entitled "System And Method For Controlling The Use And Duplication Of Digital Content Distributed On Removable Media", filed Nov. 15, 2001, which is incorporated herein by reference.

FIELD OF THE INVENTION

The present invention is generally directed to controlling the use and copying of digital content which is distributed on removable media.

BACKGROUND

In recent years, the development of digital audio compression technology coupled with the introduction of inexpensive portable audio devices has allowed consumers to carry, literally in their pocket, entire libraries of high quality music to be enjoyed almost anywhere while engaged in almost any activity. These portable devices generally use solid-state memory or miniature computer hard drives to hold hundreds or thousands of megabytes of compressed audio. In order to move music from traditional media (e.g., a Compact Disc™ containing Redbook audio) to the portable device, a consumer generally uses computer software to "rip" the CD and create files containing the compressed audio using an algorithm such as Moving Picture Experts Group (MPEG) Audio Layer 3 (commonly known as MP3). These files may then be copied to the portable device.

An unfortunate side effect of this revolution in audio compression technology has been a substantial increase in copyright infringement and piracy through file swapping over the Internet. Although sharing music with friends and acquaintances via recordable cassette tape and other physical media has been going on for years, high quality audio compression technology combined with one of any number of file swapping software programs can now allow a single consumer to purchase a single copy of an album and almost instantaneously share it with thousands of other individuals worldwide. While some sharing of music among acquaintances can serve to promote a new album or musical act resulting in increased sales, virtually unlimited sharing can drastically erode sales.

A number of potential solutions have been proposed to combat copyright infringement and unlimited copying. Many of these solutions include digital rights management (DRM) schemes which manage virtually every use of the digital content. However, in their present form, these solutions can be difficult and inconvenient to use. Other solutions simply use "anti-ripping" technology to prevent the Redbook audio of a CD from being read by a computer (thus preventing the CD from being ripped) while still allowing it to be read by home stereo equipment. However, this prevents the consumer from making a personal-use copy for use only on the consumer's portable device.

It would be useful to have a solution which prevents or reduces the unlimited file swapping that results in copyright infringement while preserving flexibility and ease of use for the consumer.

SUMMARY

The present invention provides devices, systems and methods for controlling the use of digital content so that, for example, the number of copies made of the content may be controlled or limited without greatly restricting the consumer's ability to use and enjoy the content. This may be accomplished by, for example, storing on a medium a protected copy of the digital content along with a copy of the digital content which is unreadable by a computer system.

In one possible embodiment of the present invention, the removable medium is a CD that contains both standard Redbook audio tracks which have been protected with anti-ripping technology (i.e., the section of the CD with these tracks cannot be read by a computer CD drive or computer DVD drive, but can be read by, for example a stereo system) as well as a computer readable section of the CD. The computer readable section of the CD contains protected versions of the same audio tracks in a compressed format. Software for playing, using or making copies of these compressed tracks may also be provided on the CD. The CD may be used like a conventional CD in stereo equipment or may be used in a computer to provide the consumer with a limited number of copies of the digital content for use in a portable device or on other computers.

When the removable media is placed in the consumer's computer system, the software may allow the consumer to play or otherwise use the content directly as well as allowing the consumer to make a limited number of copies which may be transferred to a portable device or transferred to another computer. The number of copies that can be made may be limited by one or more of a number of factors including, for example, the number of copies currently on the computer, the number of copies ever made, or whether copies were previously made on another computer. These copies are all stored on the computer when they are made and may then be transferred to the portable device or to another computer, or they may simply be played by the software without the removable medium needing to be in the computer.

In another possible embodiment of the present invention, the removable media is a writable CD, for example a CD-R or CD-RW that contains protected Redbook audio, a protected, compressed version of the same audio, and software for accessing the compressed audio. The CD may be used like a conventional CD in stereo equipment or may be used in a computer to provide the consumer with a limited number of copies of the digital content for use in a portable device or on other computers. The software may then write information onto the CD about the copies made or the circumstances under which the copies were made.

These embodiments and variations to them, as well as other possible embodiments, are described in more detail below.

DETAILED DESCRIPTION

In accordance with example embodiments of the present invention, a medium, especially a removable storage medium, such as a CD, stores digital music files on it that have been encrypted or protected from unauthorized access in some other fashion. The digital files may contain, for example, audio music that has been compressed using a well-known audio compression algorithm such as Sony's ATRAC™, MP3, Microsoft Windows' Media Audio™ (WMA), but the audio may be at "normal" CD fidelity. The CD may also contain software for decrypting and playing the digital files. In addition, the CD may contain standard Redbook audio that has been protected using, for example, Macrovision, Inc.'s SafeAudio™ or some other "anti-ripping" technology to prevent copying the CD using a computer. This allows typical home or car stereo equipment to play the Redbook audio directly from the CD with little to no loss of fidelity without compromising the security and control features of the present invention. The removable storage medium is not limited to CDs, but may also include MiniDisc™, Digital Versatile Disc (DVD), and other forms of removable storage media. The digital content is not limited to music but may also include other content, such as audio, video, or multimedia.

Figure 1:
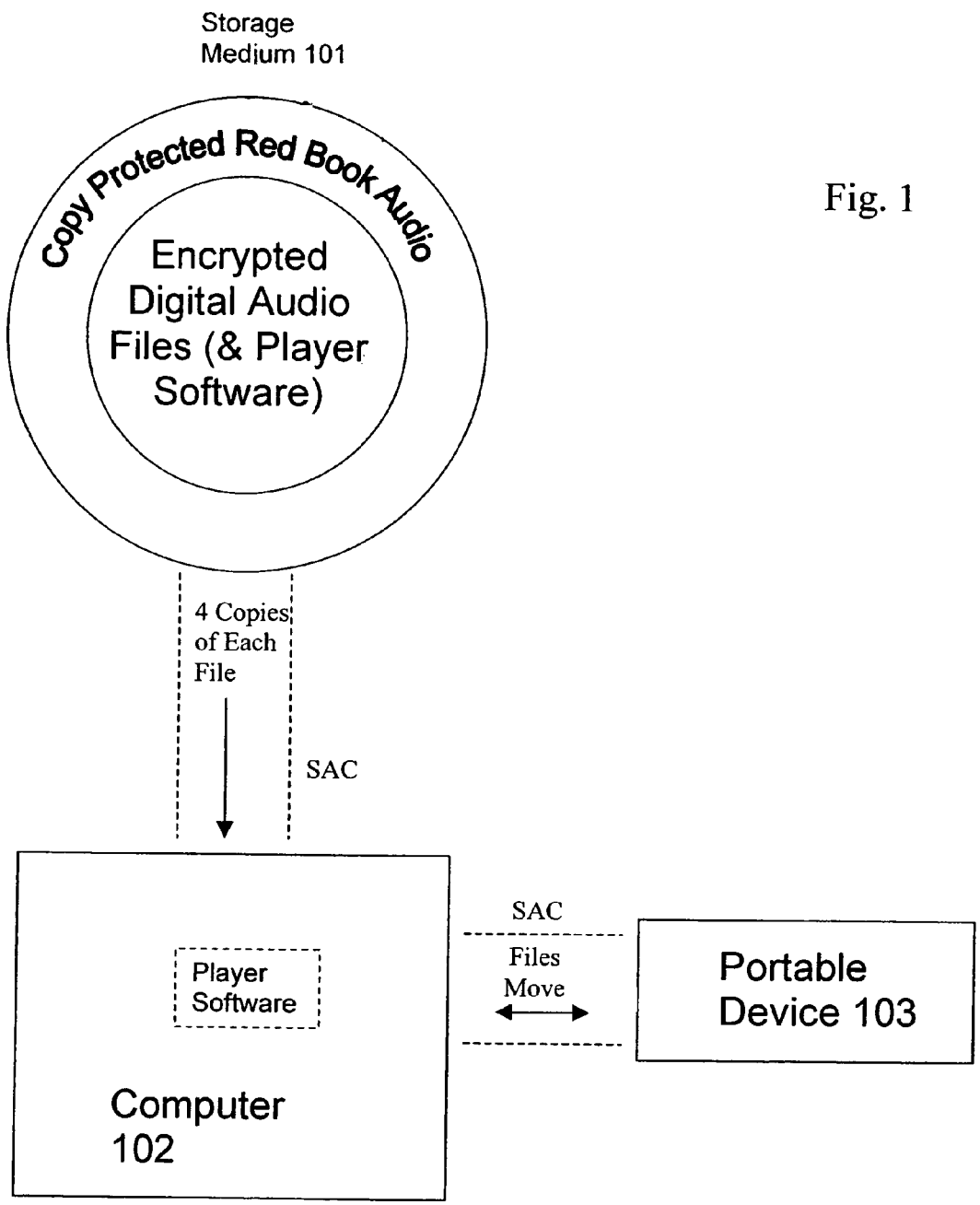
FIG. 1 illustrates an overview of an example of one embodiment of the present invention.

For example, as shown in FIG. 1, an embodiment of the present invention may include a storage medium 101 containing protected Redbook audio, which is unreadable on a computer, as well as computer readable, encrypted digital audio files (and possibly the "player" software required to use the encrypted audio files). The storage medium 101 may be used in a computer 102 which may communicate with a portable device 103. The computer 102 may already have the player software on it or it may be installed from the storage medium. The player software may be used to transfer copies of the encrypted digital audio files to the portable device 103 as further described below.

Figure 2:
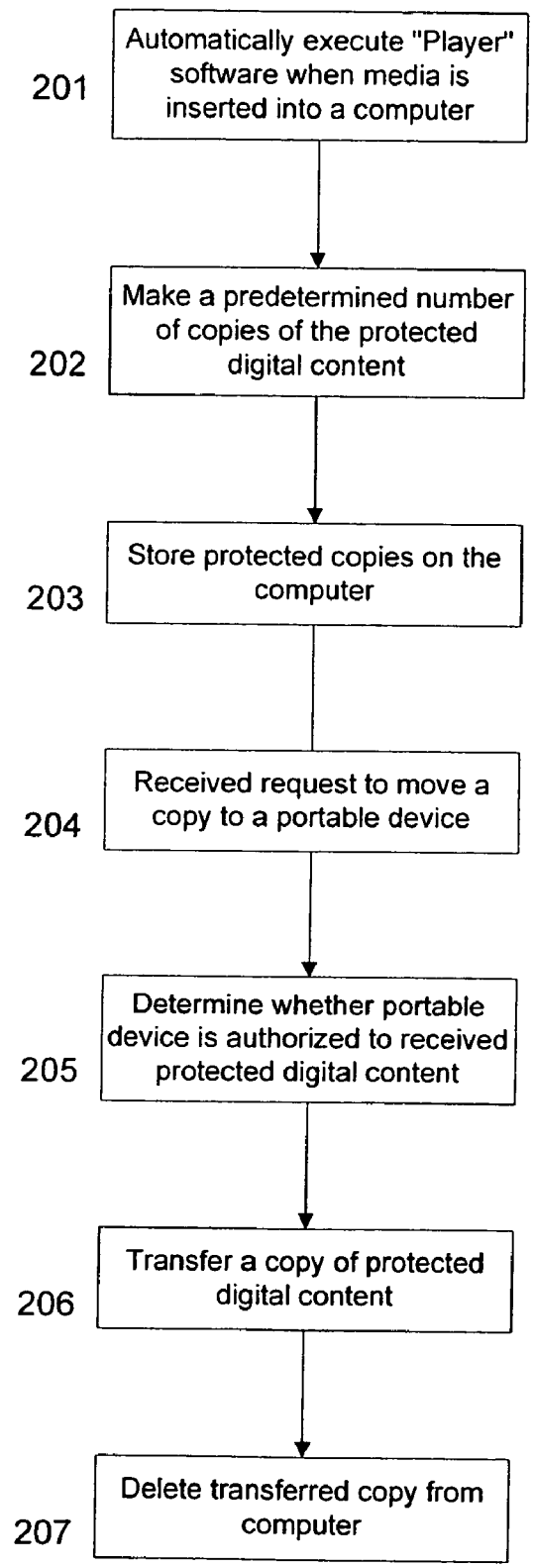
FIG. 2 illustrates a flowchart of one aspect of an embodiment of the present invention.

In one example embodiment of the present invention, control over the copying of digital content on a removable storage medium is achieved by making a limited number of protected copies of the digital content, storing the copies on a computer, and allowing the copies to be moved to other devices with no further copies being made. In this embodiment (as briefly illustrated in FIGS. 1 and 2), when the storage medium is inserted into or connected to a computer, the player software on the CD is automatically executed (Step 201). The player software installs itself on the computer and then may make a predetermined number of copies (e.g., 4 copies) of the digital files on the CD (Step 202) and stores them on the computer (e.g., on the hard drive) (Step 203). Each copy of the digital files is encrypted and may be decrypted and played only by the player software or other authorized software. The player software may also be used to move (not copy) the digital files to other devices. All copying and moving of the digital files may be performed using a secure authenticated channel (SAC). For example, as illustrated in FIG. 2, a user may connect a portable device to the computer and request that a digital file be transferred to the device (Step 204). The player software may contact the portable device and verify that the device is authorized to receive the digital content (Step 205). For example, the player software may verify that the device has certain content protection and/or tamper resistance capabilities so that the content will not be vulnerable to unauthorized access while stored in the device. The player software can also perform an identity authentication routine to insure that the portable device is not an "imposter" using, for example, a unique authentication ID number or similar means. Once the device has been authenticated, the player software transmits one of the copies of the requested digital file and the information necessary to use it (e.g., its decryption key) to the portable device (Step 206). After or contemporaneously with transmission of the copy of the digital file, the player software deletes that copy from the hard drive of the computer (Step 107); thus, the digital file is "moved" to the portable device and no additional copies have been created.

The movement of the copies to other devices may also be controlled. For example, the player software may be configured such that copies of digital files can only be moved to authenticated portable devices. Alternatively, the player software may be configured to allow copies to be moved to any authenticated device including other computers that are equipped with authenticated player software, thus allowing some limited file swapping. The player software may also be configured to allow copies to be moved only once using, for example, controls similar to those of Serial Copy Management Systems (SCMS) (e.g., when the copy is moved to another device, the copy is marked in some fashion so that the device to which it is moved will not allow it to be moved again).

Additionally or alternatively, copies of files made by the player software may also include additional information that may be used to track unauthorized copies or copies that have had their encryption or protection broken. For example, each copy may include information that uniquely identifies the computer on which the copy was originally made. Alternatively, a unique identification number may be encoded on the storage medium and then transferred to each of the copies of the digital files. Thus, each copy would contain information that would uniquely identify the particular storage medium from which it was originally made. This identification information may be stored in various ways within the copies. For example, the decryption key for each file may be based on the identification information such that the identification information could be later extracted from the key, if desired.

The number of copies of the digital files that are made when the storage medium is placed in the computer may be determined in several ways. For example, the player software may be configured to make a particular number of copies (e.g., 4 copies) of every digital file on a CD, every time the CD is inserted into a computer. Alternatively, the player software may be configured to set a maximum or default number of copies that may be made and the user may be able to elect to have a smaller number of copies made due to a limited amount of available storage space on the computer, for example. The number of copies to be made may also vary based on the storage medium. For example, each CD may be encoded with information that specifies how many copies the player software may make.

Figure 3:
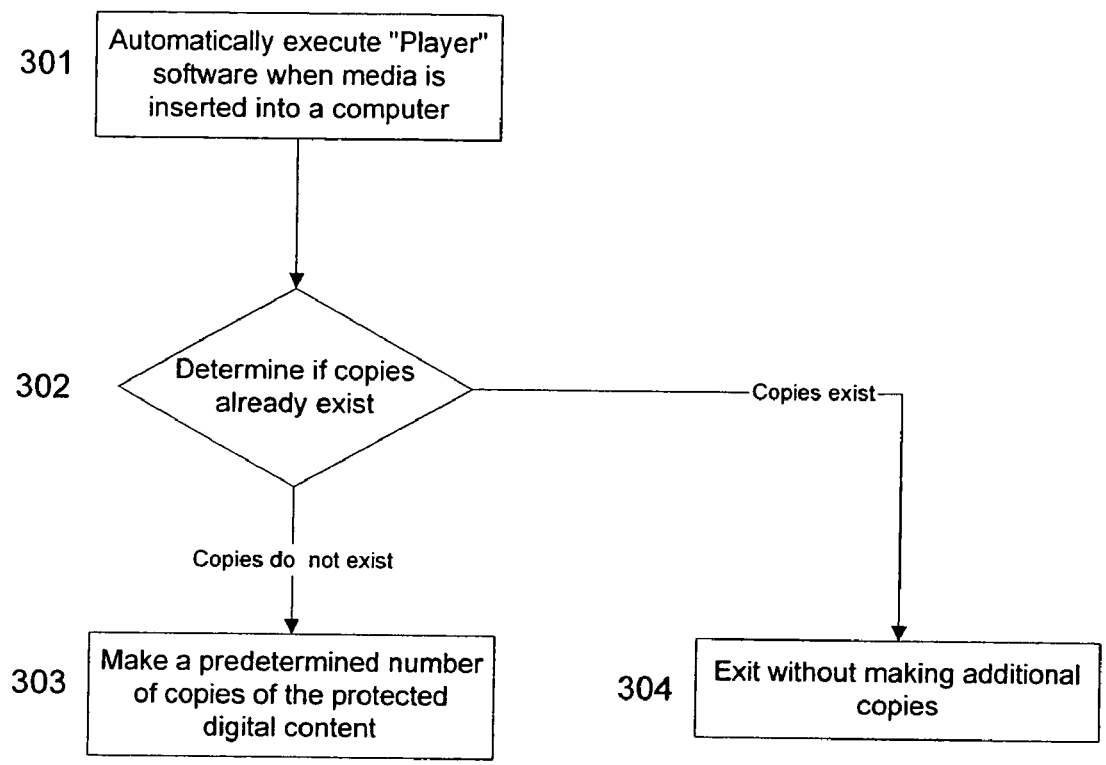
FIG. 3 illustrates a flowchart of one aspect of an embodiment of the present invention.

In this example embodiment, as illustrated in FIG. 3, when the storage medium is inserted into the computer (Step 301), the player software may also determine if copies of the digital files already exist on the computer from, for example, a previous use of the storage medium in the computer (Step 302). If copies do not exist the player software will make the predetermined number of copies (Step 303). If copies already exist, the player software will not make additional copies (Step 304). Alternatively, the player software may be configured to use the same filenames and place copies in the same location every time copies are made. Thus, the player software need not check for existing copies, but if any did exist they would simply be overwritten by the new copies.

The player software may also be configured so that it can play the digital files directly from the storage medium without making any copies. Thus, if a user does not wish to make any copies or if the maximum number of copies have already been made from the storage medium, the storage medium may still be used to play the audio, so long as the storage medium is in the computer at the time.

Figure 4:
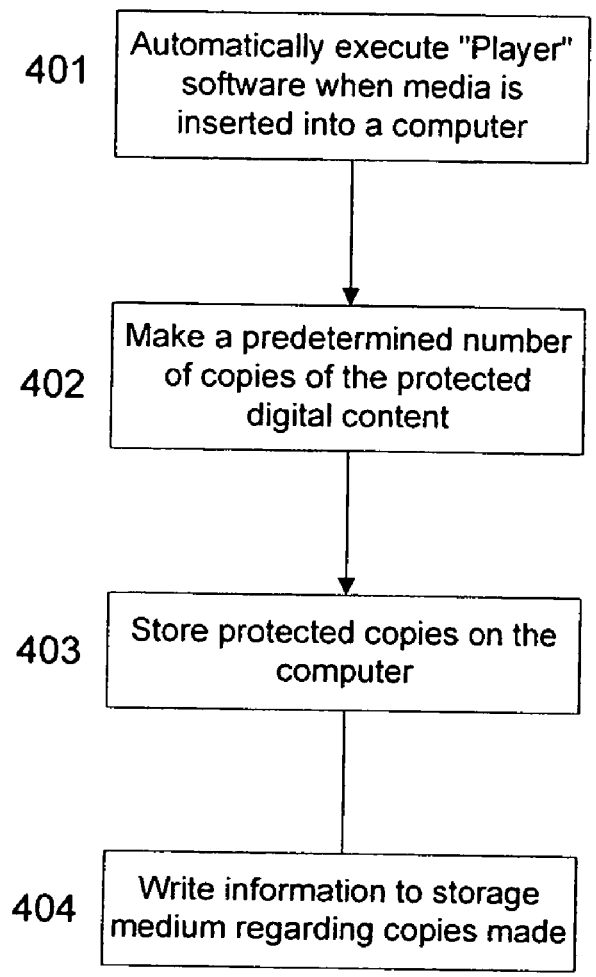
FIG. 4 illustrates a flowchart of one aspect of an embodiment of the present invention.

In an alternate embodiment, control over the copying of digital content on a removable storage medium is achieved by writing information to the storage medium upon the first use of the storage medium and using that information to determine future usage (e.g., copying, moving, playing, viewing) of the digital content. In this embodiment the removable storage media may include, for example, a writable medium such as CD-R or MiniDisc. In this embodiment as illustrated in FIG. 4, for example, when a CD is placed into a computer, the player software on the CD is automatically executed and installs itself on the computer (Step 401). The player software may then make copies of the digital files on the CD and store them in the computer (e.g., on the hard drive) (Steps 402 and 403. Contemporaneously with the copies being made, the player software writes information to the CD (Step 404). The next time the player software is run (e.g., the next time the storage medium is placed into a computer), the player software can read the information from the CD and use it to determine if more copies of the digital files can be made. Any copies of the digital files made under this embodiment may be moved but not copied, similar to the previously described embodiment.

The information written to the storage medium may include information that uniquely identifies the computer on which the copies were made such as an identification number (e.g., the serial number of the operating system) or a hardware description of the computer (e.g., a list of the hardware components in the computer such that it is unlikely that two computers would be identical). Thus, for example, the storage medium may be "bound" to the computer. Alternatively, the information may include how many copies have been made of the digital files, or how many additional copies may be made of the digital files. For example, the player software may not allow copies of the digital files to be made on any computer other than the one on which copies were made initially, or the player software may not allow more than 4 total copies to be made regardless of on which computer they are made. Another alternative is that once the maximum number of copies have been made, the player software may erase the digital files or the decryption keys from the storage medium.

The player software used by embodiments of the present invention may be universal software that could be used with any storage medium that used the protection system of the invention. For example, each protected CD may have a copy of the same player software on it and that player software reads the digital files and their respective decryption information off of the CD for installation on the computer. If the universal player software already exists, it is not necessary to copy the software again and merely the digital files and any information necessary to use them is copied. File copies and decryption information for multiple CDs may then be maintained by a single copy of the player software using, for example, a secure database. Alternatively, it may be desirable to have multiple versions of the player software, for example, one specific to each music distributor. Under this alternative, each music distributor may be responsible for its own software, reducing the amount of coordination necessary to successfully implement embodiments of the present invention. The software would work similarly to the universal player, but each specific version would only work with CDs produced by a particular company. The present invention may also be implemented with player software versions that are unique to each particular album and are maintained separately from the software for all other albums. These unique versions may have special features such as enhanced or increased security levels. Optionally, the player software may also be downloaded over a network such as the Internet.

In accordance with example embodiments of the invention, the integrity of the player software is maintained in order to ensure the security and control provided by the invention. If the player software is tampered with, it may be possible to gain access to the digital content in an unprotected form. When the player software is executed directly from the storage medium, it is unlikely to have been tampered with. However, once installed on the computer, it becomes vulnerable to reverse engineering and other tampering. One possible method of authenticating the integrity of the player software is to have the player software or some portion of the player software be reinstalled on the computer each time the storage medium is inserted into the computer. Any existing player software that may have been tampered with is simply overwritten, erased, or disabled. Another method of protecting the player software is to have part of the player software, or another software program on the storage medium that executes when the medium is inserted, check the player software previously installed on the computer using a digital signature, a checksum, or any other well known method of integrity checking. If the player software fails the integrity check, it is rejected or overwritten. Alternatively, the integrity checking software may connect to a central server using a network and request that server to perform an integrity checking routine on the player software and even the storage medium itself.

In the example embodiments of the present invention, the copies of the digital files may be encrypted or protected in a variety of ways. One possible method of protecting the files is to encrypt each copy of each file with a unique key. For example, the player software loads each encrypted song or track from a CD, decrypts it using the appropriate key, makes 4 copies of the track, and then encrypts each copy with a different key. This method would provide the greatest level of security against unauthorized access, but would also require more time to perform the copying operation and would require managing a much greater number of keys. Alternatively, all the copies of a particular track made on a particular computer could be encrypted with the same key or all copies of a track could be encrypted with the same key regardless of what computer on which they were made. The encryption keys may be generated locally on the computer performing the copying, downloaded from a central server, or already present on the storage medium. The encryption algorithm used could be, for example, any symmetric or asymmetric encryption algorithm that provides a balance of adequate protection without being so computationally intensive that it adversely effects the performance of the computer or portable device.

The present invention is not limited to the specific embodiments described. It is expected that those skilled in the art will be able to devise other implementations that embody the principles of the present invention and remain within its scope.

What is claimed is:

1. A method for making a storage medium for the distribution of digital content, comprising:

storing, on a storage medium, digital content data adapted to be unreadable on a computer system;

storing, on the storage medium, an encrypted version of the digital content data that is readable on the computer; and storing, on the storage medium, a plurality of instructions adapted to be executed on a microprocessor, the instructions which, when executed, control the use of the encrypted version of the digital content data, with a method comprising:

automatically producing at least one copy, but no more than a predetermined maximum number of copies, of the encrypted version of the digital content data; and automatically storing said at least one copy on a storage device connected to the computer system.

2. The method of claim 1 wherein the digital content data comprises a plurality of Redbook audio tracks.

3. The method of claim 2 wherein the plurality of Redbook audio tracks are adapted to be readable only on stereo equipment.

4. The method of claim 2 wherein the encrypted version of the digital content data comprises encrypted, compressed copies of the plurality of Redbook audio tracks.

5. The method of claim 1 wherein the plurality of instructions stored on the storage medium which, when executed, control the use of the encrypted version of the digital content data, further comprises:
controlling access to said at least one copy.

6. The method of claim 5 wherein said access is controlled by preventing copying of the at least one copy.

7. The method of claim 5 wherein said access is controlled by only allowing the at least one copy to be transferred to an authenticated device.

8. The method of claim 7 wherein a transferred copy is marked to indicate that it may not be further transferred.

9. The method of claim 7 wherein said authenticated device is another computer system.

10. The method of claim 7 wherein said authenticated device is a portable audio device.

11. The method of claim 1 wherein the plurality of instructions stored on the storage medium which, when executed, control the use of the encrypted version of the digital content data, further comprises:
writing information to said digital storage medium regarding the production of the at least one copy.

12. The method of claim 11, wherein the plurality of instructions stored on the storage medium which, when executed, control the use of the encrypted version of the digital content data, further comprises:
determining the predetermined maximum number of copies to be produced based on information previously written to the digital storage medium.

13. The method of claim 12 wherein said information written to the digital storage medium includes information identifying the computer system.

14. The method of claim 13 wherein said information identifying the computer system includes information about the hardware configuration of the computer system.

15. The method of claim 12 wherein said information written to the digital storage medium includes information identifying the number of copies made.

16. An article of manufacture comprising a computer-readable medium having stored thereon instructions adapted to be executed by a processor, the instructions which, when executed, control the use of encrypted digital content, with a method comprising:
receiving, by a computer system, the encrypted digital content;
upon receiving the encrypted digital content, and without user input, automatically producing a plurality of copies of the encrypted digital content; and
storing the plurality of copies of the encrypted digital content in the computer system.

17. The article of manufacture of claim 16 wherein said method further comprises:
allowing no more than a predetermined number of copies of the encrypted digital content to be stored in the computer system at any given time.

18. The article of manufacture of claim 16 wherein said method further comprises:
allowing the user to move at least one of the copies of the encrypted digital content to another device; and
automatically deleting the or each of the at least one of the copies of the encrypted digital content from the computer system when the user moves the or each of the at least one of the copies of the encrypted digital content to another device.

19. The article of manufacture of claim 16 wherein the plurality of copies of the encrypted digital content are stored on a hard drive of the computer system.

20. The article of manufacture of claim 16 wherein the plurality of copies of the encrypted digital content are encrypted using a respective plurality of different encryption keys.

21. The article of manufacture of claim 20 wherein the plurality of different encryption keys are downloaded from a central server.

22. The article of manufacture of claim 20 wherein the plurality of different encryption keys are generated by the computer system.

23. A method for controlling the use of encrypted digital content comprising:
receiving, by a computer system, the encrypted digital content;
upon receiving the encrypted digital content, and without user input, automatically producing a plurality of copies of the encrypted digital content; and
storing the plurality of copies of the encrypted digital content in the computer system.

24. The method of claim 23 further comprising:
allowing no more than a predetermined number of copies of the encrypted digital content to be stored in the computer system at any given time.

25. The method of claim 23 further comprising:
allowing the user to move at least one of the copies of the encrypted digital content to another device; and
automatically deleting the or each of the at least one of the copies of the encrypted digital content from the computer system when the user moves the or each of the at least one of the copies of the encrypted digital content to another device.

26. The method of claim 23 wherein the plurality of copies of the encrypted digital content are stored on a hard drive of the computer system.

27. The method of claim 23 wherein the plurality of copies of the encrypted digital content are encrypted using a respective plurality of different encryption keys.

28. The method of claim 27 wherein the plurality of different encryption keys are downloaded from a central server.

29. The method of claim 27 wherein the plurality of different encryption keys are generated by the computer system.

* * * * *